(12) United States Patent
Gallacher

(10) Patent No.: US 12,321,523 B2
(45) Date of Patent: Jun. 3, 2025

(54) HAPTIC FEEDBACK DEVICE AND METHOD

(71) Applicant: Haply Robotics Inc., Montreal (CA)

(72) Inventor: Colin Gallacher, Montreal (CA)

(73) Assignee: Haply Robotics Inc., Montreal (CA)

( * ) Notice: Subject to any disclaimer, the term of this patent is extended or adjusted under 35 U.S.C. 154(b) by 0 days.

(21) Appl. No.: 18/859,702

(22) PCT Filed: Mar. 22, 2023

(86) PCT No.: PCT/CA2023/050374
§ 371 (c)(1),
(2) Date: Oct. 24, 2024

(87) PCT Pub. No.: WO2023/178428
PCT Pub. Date: Sep. 28, 2023

(65) Prior Publication Data
US 2025/0103139 A1      Mar. 27, 2025

Related U.S. Application Data

(60) Provisional application No. 63/323,731, filed on Mar. 25, 2022.

(51) Int. Cl.
*G06F 3/01*        (2006.01)
*A63F 13/212*      (2014.01)
(52) U.S. Cl.
CPC ............ *G06F 3/016* (2013.01); *A63F 13/212* (2014.09)
(58) Field of Classification Search
CPC ............................... G06F 3/016; A63F 13/212
See application file for complete search history.

(56) References Cited

U.S. PATENT DOCUMENTS

2012/0232780 A1    9/2012  Delson
2018/0284890 A1*  10/2018  Bergmann ............. G06F 3/016
(Continued)

OTHER PUBLICATIONS

International Searching Authority—Candadian Intellectual Property Office; International Search Report filed in corresponding International Application No. PCT/CA2023/050374, dated May 30, 2023, 3 pages.

(Continued)

*Primary Examiner* — Ryan A Lubit
(74) *Attorney, Agent, or Firm* — Black McCuskey

(57) ABSTRACT

Described are various embodiments of a haptic feedback device and method. In one embodiment, the haptic feedback device comprises a modular section, the modular section comprising an anchor component having a first impedance coupled to the skin of the arm at a first location; a low mass component having a second impedance coupled to the skin of the arm at a second location; and an inertial mass component having a third impedance mechanically coupled to said anchor component and to said low mass component via one or more couplings; and configured to provide actuation thereto. The first impedance is larger than said second and third impedances, so that upon said actuation said low mass component is displaced by a larger amount than said anchor portion, said displacement of the low mass component moving a portion of the skin proximate said second location thereby creating a haptic feedback.

20 Claims, 5 Drawing Sheets

(56) References Cited

U.S. PATENT DOCUMENTS

| | | | |
|---|---|---|---|
| 2019/0384390 A1* | 12/2019 | Cruz Hernandez | A41D 19/0024 |
| 2020/0269130 A1* | 8/2020 | Provancher | A63F 13/24 |
| 2021/0400248 A1* | 12/2021 | Blanke | H04S 7/302 |
| 2022/0096010 A1* | 3/2022 | Vankipuram | A61B 5/02438 |
| 2022/0100273 A1* | 3/2022 | Vankipuram | A61B 5/313 |
| 2022/0121283 A1* | 4/2022 | Vankipuram | G06F 3/014 |
| 2022/0350410 A1* | 11/2022 | Salada | G06V 40/113 |
| 2023/0324994 A1* | 10/2023 | Do | G06F 3/014 715/702 |
| 2024/0231489 A1* | 7/2024 | Kao | G06F 3/016 |

OTHER PUBLICATIONS

International Searching Authority—Candadian Intellectual Property Office; Written Opinion filed in corresponding International Application No. PCT/CA2023/050374, dated May 30, 2023, 3 pages.

\* cited by examiner

HAPTIC FEEDBACK DEVICE AND METHOD

CROSS-REFERENCE TO RELATED APPLICATIONS

This application claims the benefit of U.S. Provisional Application No. 63/323,731 filed Mar. 25, 2022, which is incorporated herein by reference in its entirety.

FIELD OF THE DISCLOSURE

The present disclosure relates to haptic devices, and, in particular, to a haptic feedback device and method.

BACKGROUND

Immersive simulations, for example those provided by computer or video games, rely on the ability to provide feedback to the player or user based on user interaction or events occurring in the simulated environment, in a way that increases immersion. While some level of haptic feedback, meaning feedback provided in the form of tactile physical sensations, is often provided, it is typically delivered using vibrating or rumbling controllers and/or buttons or the like, that provides limited improvements to immersion.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concepts described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a haptic feedback device and method that provides different types of sophisticated haptic feedback to the user's arm and wrist, including skin stretch haptics, vibrotactile haptics, force-feedback haptics, and inertial actuation.

In accordance with a first aspect, there is provided a haptic feedback device for providing haptic feedback to an arm of a user comprising: a modular section, the modular section comprising: an anchor component having a first impedance coupled to the skin of the arm at a first location; a low mass component having a second impedance coupled to the skin of the arm at a second location; an inertial mass component having a third impedance mechanically coupled to said anchor component and to said low mass component via one or more couplings; and configured to provide actuation thereto; and wherein said first impedance is larger than said second and third impedances, so that upon said actuation said low mass component is displaced by a larger amount than said anchor portion, said displacement of the low mass component moving a portion of the skin proximate said second location thereby creating a haptic feedback.

In one embodiment, the inertial mass component comprises a linear actuator.

In one embodiment, the anchor component and the low mass component are each affixed to the skin via an adhesive or fastener.

In one embodiment, the first location of the anchor component is located on a distal portion of the arm relative to said second location of the low mass component.

In one embodiment, the first location of the anchor component is located on a proximal portion of the arm relative to said second location of the low mass component.

In one embodiment, the haptic feedback device comprises a plurality of modular sections distributed around the circumference of the arm.

In one embodiment, the plurality of modular sections are coupled together via a restraining means.

In one embodiment, the modular section is configured to provide skin stretch haptics by displacing via a static force provided by the inertial mass component the low mass component away relative to the anchor component causing a portion of the skin between the low mass component and the anchor component to stretch.

In one embodiment, the modular section is configured to provide inertial actuation by having the inertial mass component vibrating at a designated frequency.

In one embodiment, the modular section is configured to provide linear recoil actuation by having the inertial mass component actuating in pulses in a designated direction to provide an impulse to the arm along a primary axis.

In one embodiment, the modular section is a first modular section positioned of a first portion of the arm, further comprising a second modular section positioned on a second portion of the arm opposite said first portion; the haptic feedback device further comprising: an elongated grip portion configured to be held in the hand of the user, the grip portion mechanically coupled at one end thereof to the inertial mass component of the first modular section, and coupled at a second end thereof to the inertial mass component of the second modular section; and wherein the inertial mass components of the first modular section and of the second modular sections are configured to be linearly displaced thereby providing torques and forces to the grip portion and provide a force feedback to the hand.

In one embodiment, the haptic feedback device comprises one or more sensors communicatively coupled to the inertial mass component.

In one embodiment, the one or more sensors comprise at least one myoelectric sensor coupled to the skin of the arm configured to provide position or motion data to the inertial mass component.

In one embodiment, the modular section is communicatively coupled to a computing device configured to generate a simulated environment, and wherein said haptic feedback is provided upon receiving haptic feedback instructions from the computing device.

In accordance with a second aspect, there is provided a method for providing haptic feedback to the arm of a user comprising the steps of: affixing an anchor component having a first impedance coupled to the skin of the arm at a first location; affixing a low mass component having a second impedance to the skin of the arm at a second location; actuating via an inertial mass component mechanically coupled to the anchor component and the low mass component, said anchor component and the low mass component; and wherein said first impedance is larger than said second and third impedances, so that upon said actuation said low mass component is displaced by a larger amount than said anchor portion, said displacement of the low mass component moving a portion of the skin proximate said second location thereby creating a haptic feedback.

In one embodiment, the actuation provided by the inertial mass component displaces via a static force the low mass component away relative to the anchor component causing a portion of the skin between the low mass component and the anchor component to stretch.

In one embodiment, the actuation is an inertial actuation provided by having the inertial mass component vibrating at a designated frequency.

In one embodiment, the actuation is a linear recoil actuation provided by having the inertial mass component actuating in pulses in a designated direction to provide an impulse to the arm along a primary axis.

In one embodiment, the method further comprises the steps of, after said affixing the low mass component but before said actuating: receiving, by the inertial mass component, from a myoelectric sensor coupled to the skin of the arm and communicatively coupled to the inertial mass component, position, or motion data to the inertial mass component; and wherein said actuating is based on, at least in part, said position or motion data.

In one embodiment, the method further comprises the steps of, after said affixing the low mass component but before said actuating: receiving, by the inertial mass component, from a computing device communicatively coupled to the inertial mass component, haptic feedback instructions; and wherein said actuating is provided based, at least in part, on said haptic feedback instructions.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

Figure 1:
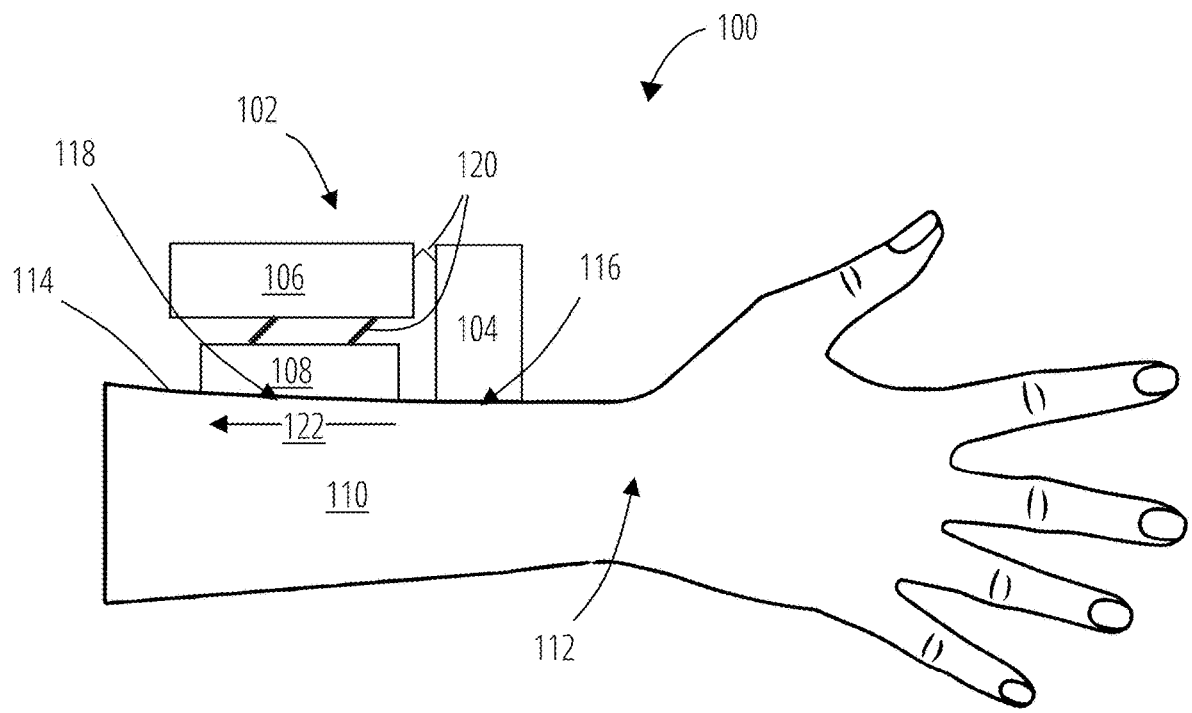
FIG. 1 is a schematic diagram illustrating a haptic gauntlet comprising a single modular section attached to the arm of a user, in accordance with one embodiment.

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures, and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The purpose of the haptic feedback device and method of the present disclosure, in accordance with different embodiments, is to provide haptic feedback in a variety of different forms to the forearm and wrist of the user to increase the immersion and improve the quality of a virtual experience. Advantageously, the haptic device of the present disclosure, also referred to as the haptic gauntlet hereinafter, comprises one or more arm-mounted haptic devices that provides different types of haptic feedback to the user's arm and wrist, including skin stretch haptics, vibrotactile haptics, force-feedback haptics, and inertial actuation, such as linear recoil actuation.

In some embodiments, the gauntlet is placed in contact with the forearm of the user and encircles the forearm like a bracelet. It may be held in place by an adhesive, sticky tape, or other fastening material so that it does not slip. In some embodiments, the gauntlet may consist of a plurality of modular sections, each of which is capable of providing haptic feedback in the form of skin stretch haptics, vibrotactile haptics, force-feedback haptics, and linear recoil actuation. In some embodiments, the plurality of modular sections may be rigidly coupled or connected to each other, or in other embodiments connected by an elastic connector (e.g., such as straps or bands of resilient or elastic materials or fabric) to maintain structural integrity in use and to prevent the gauntlet from slipping off the arm of the user.

In some embodiments, each modular section comprises an anchoring component that adheres to the skin and is mechanically coupled to an inertial mass component, such as a voice coil actuator or other linear actuator, which is not in contact with the skin. The inertial mass component is further mechanically coupled to a low mass adhesive component that adheres to the skin. The impedances of the different components of the modular sections of the gauntlet determine the behavior and type of force feedback desired, and these impedances are based on the relative strength of the adhesiveness of the low mass adhesive component and anchor component and the mass and momentum of the inertial mass component.

Uses of the haptic gauntlet may include improvement of immersion in virtual reality scenarios, or in any other situations where haptic feedback may be beneficial. In one non-limiting example, the user may plunge their hand into a virtual simulated viscous substance, and the skin stretch haptics may actuate in the opposite direction of motion of the hand to simulate the resistance of the substance. In another example, the linear recoil actuators may accelerate the arm forward to represent being pulled by an external force, such as another player or character in a game.

FIG. 1 shows a haptic feedback device or gauntlet 100 for wearing around a user's forearm and/or wrist, in accordance with one embodiment. In the illustrated embodiment, the gauntlet 100 comprises, as an example only, a single module or modular section 102 that provides haptic feedback through the combination of an anchor component 104, an inertial mass component 106, and a low mass adhesive component 108. The size of the components is not limited to the one illustrated and may be smaller. In this example, the anchor component 104 is placed on the distal portion of the arm 110 relative to the rest of the modular section 102, which means that the anchor component 104 is closer to the user's wrist 112. In this example, the anchor component 104 and low mass adhesive component 108 are attached, fastened, or adhesively coupled to the skin 114 at two separate locations 116 and 118, respectively, by means of an adhesive, fastener, or other restraining mechanism, and are further mechanically coupled to the inertial mass component 106 via one or more links or couplings 120. During operation, the motion of the inertial mass component 106, provided for example via the use of one or more actuators, can provide different forms of actuation for feedback to the user. Thus, it should be understood that the inertial mass component 106 as illustrated typically includes a housing comprising therein the one or more actuators and other electronics components.

For example, to provide skin stretch feedback, the anchor component 104 may have the highest impedance with respect to the other components, and would thus stay fixed in place during operation, while the movement of the inertial mass component 106 in a position control mode would then cause the low mass adhesive component 108, which has a lower impedance, to move (as shown by the arrow 122). The skin stretch feedback would apply static forces to the surface of the skin such that the low mass adhesive component 108 and the skin that it is attached to would translate away relative to the anchor component 104, causing a portion of the skin between the low mass adhesive component 108 and the anchor component 104 to stretch (e.g., between locations 118 and 116).

To provide inertial actuation, in some embodiments, the inertial mass component 106 may be configured to oscillate at a high frequency (e.g., 20+Hz) to provide a vibrotactile or rumble sensation to the user's arm. The stroke length of the inertial mass component 106 may be tuned such that the low mass adhesive component 108 would not translate significantly relative to the anchor component 104.

To provide linear recoil actuation, in some embodiments, the actuation of the inertial mass component 106 may be pulsed in a specific direction to provide the inertial forces necessary to provide an impulse to the user's arm along its primary axis.

While FIG. 1 shows the modular section 102 oriented along the length of the arm 110, other configurations using different orientations wherein the anchor component 104 and the low mass adhesive component 108 are located at different radial locations along the circumference of the arm may also be used, without limitation.

Figure 2:
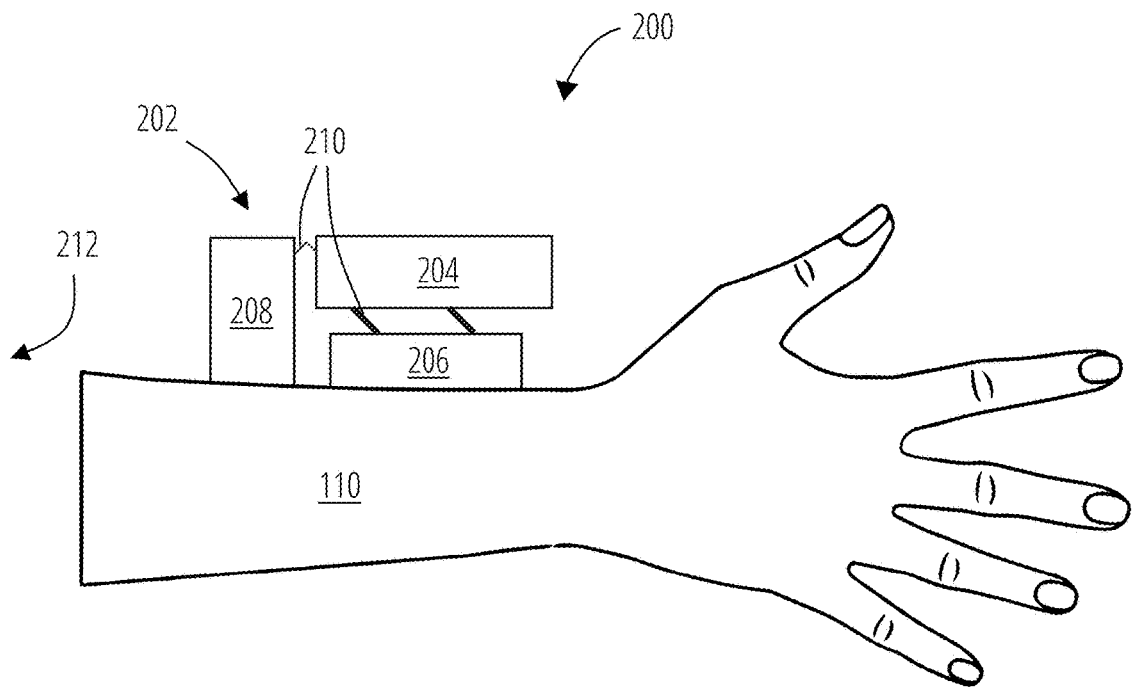
FIG. 2 is a schematic diagram illustrating a haptic gauntlet comprising a single modular section, in accordance with a second embodiment.

FIG. 2 shows another example of a haptic gauntlet 200 comprising a single modular section 202, in accordance with another embodiment. In this example, the modular section 202 operates similarly to the embodiment of FIG. 1 (e.g., with the inertial mass component 204 moving the low mass adhesive components 206 with respect to the anchor component 208 via one or more couplings 210) except that the anchor component 208 is placed on the proximal portion of the arm 110 relative to the rest of the modular section 202, which means that it anchors closer to the user's elbow (not shown, located in the direction of arrow 212).

Figure 3:
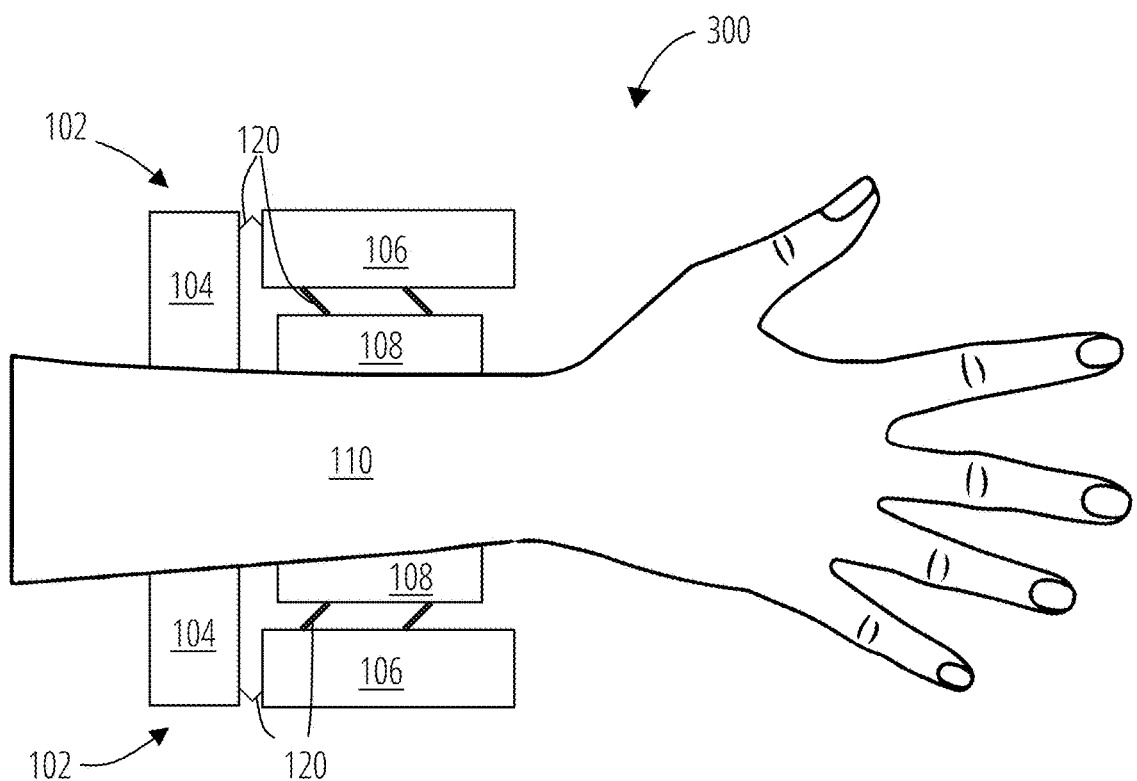
FIG. 3 is a schematic diagram illustrating a haptic gauntlet comprising two modular sections located on the top and bottom parts of the arm, in accordance with another embodiment.

FIG. 3 shows a haptic gauntlet 300 comprising two modular sections 102 represented on both the top and bottom parts of the arm, in accordance with another embodiment. In this example, each modular section 102 has the anchor component 104 located on the proximal portion of the arm 110, and the motion of the inertial mass components 106 creates haptic feedback in the form of skin stretch haptics, vibrotactile haptics, and linear recoil actuation. While the example of FIG. 3 uses the modular sections 102 of FIG. 1 (e.g., with the anchor component 104 located on the proximal portion of the arm 110), the modular sections 202 of FIG. 2 may equally also be used as well, in replacement of or in addition to the illustrated modular sections. Furthermore, while only two modular sections 102 are illustrated in FIG. 3, other embodiments may include a plurality of these modular sections surrounding the circumference of the user's arm 110, and there is no limit on how many modular sections or modules can be included in the haptic gauntlet 300.

Figure 4:
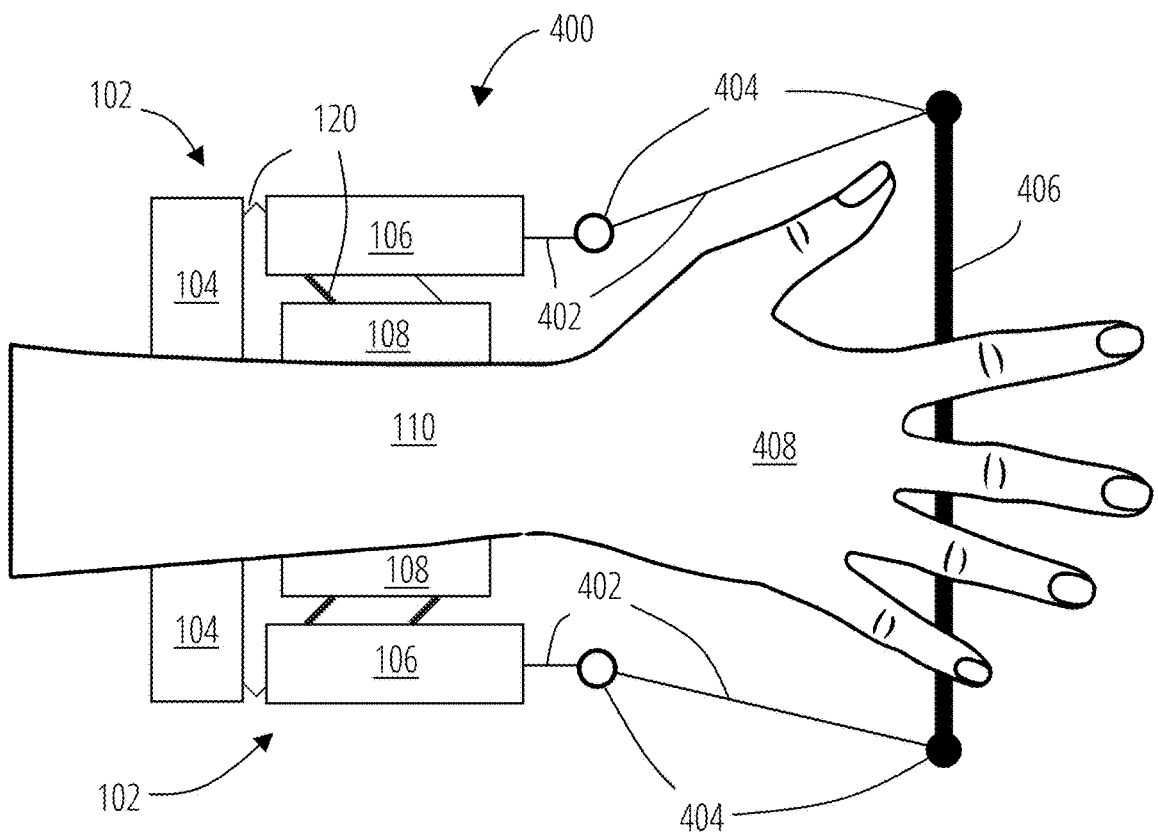
FIG. 4 is a schematic diagram illustrating a haptic gauntlet comprising two modular sections coupled to a grip held in the user's hand, in accordance with another embodiment.

FIG. 4 shows another example of a haptic gauntlet 400 comprising two modular sections 102 configured to provide force feedback, in accordance with another embodiment. In this example, the haptic gauntlet 400 is operable to provide force feedback via the use of two or more rigid or flexible links 402, each of which has one end that attaches to a joint 404 on the inertial mass component 106 of a modular section 102 of the gauntlet and the other end which attaches to a bar, handle or grip 406 held in the user's hand, on the same arm as the gauntlet. This grip 406 can be actuated by the linear movement of the inertial mass components 106 to provide force feedback haptic feedback that can apply torques and forces to the grip 406, which thereby provides forces and torques to the user's hand. This embodiment can provide force feedback haptic feedback by the actuation of the grip 406 held in the user's hand 408. The movement of the inertial mass component 106 actuates the linkages 402 connecting to the grip 406, and joints 404 established between the inertial mass components 106 and the linkage 402 as well as the linkage 402 and the grip 406 allow for force to be transmitted through the mechanism to the user's hand 408, providing force feedback.

Figure 5:
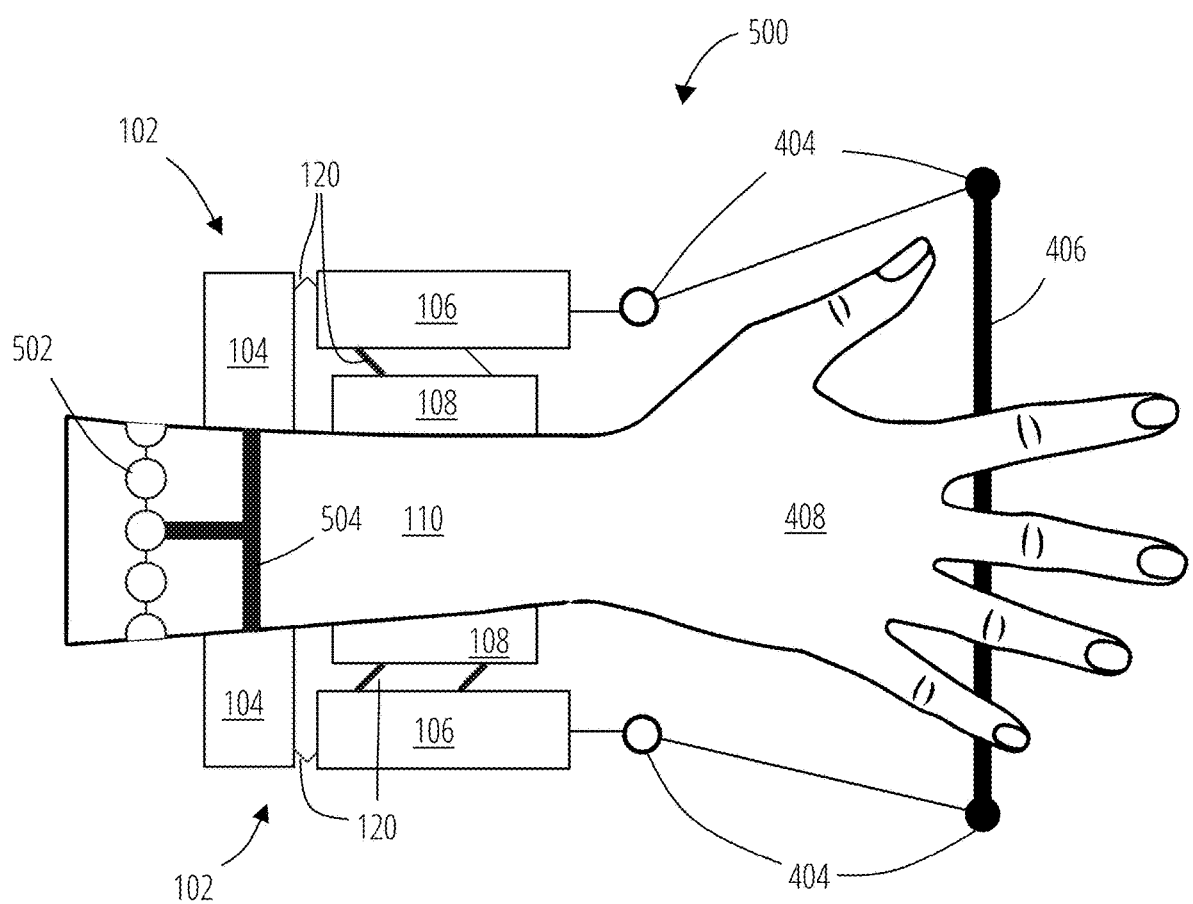
FIG. 5 is a schematic diagram illustrating the haptic gauntlet of FIG. 4 further comprising a myoelectric band for receiving input from the user, in accordance with one embodiment.

FIG. 5 shows a haptic gauntlet 500, similar to the one shown in FIG. 4, receiving input from the user by means of a myoelectric band 502, in accordance with another embodiment. The myoelectric band 502 is configured to sense electrical impulses in the muscles of the forearm to provide, for example, information to the gauntlet's processing unit about the position and movement of the arm. This can help improve the realism and precision of the haptic user experience through the haptic gauntlet 500. The details regarding the use of a myoelectric band are known in the art and will not be discussed here in detail. In this example, the myoelectric band 502 is communicatively coupled to the modular sections 102 via a communication link 504 (e.g., cable or the like), although other embodiments may have the band communicating wirelessly to the modular sections 102. In addition, while the myoelectric band 502 is illustrated with the an embodiment comprising the grip 406 functionality, it may also be used with any other embodiment of the present disclosure, without limitation.

Figure 6:
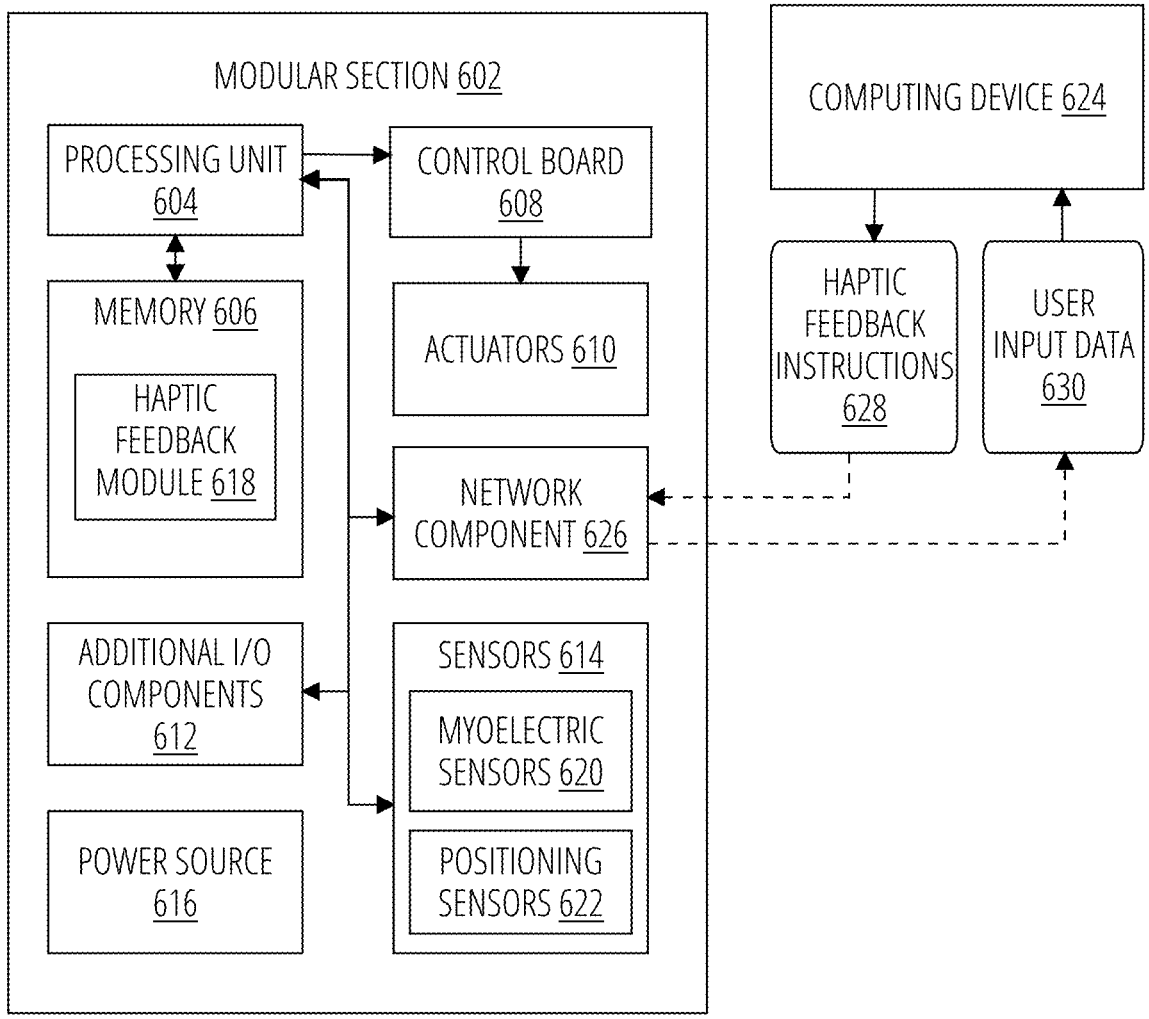
FIG. 6 is a schematic diagram illustrating a modular section comprising a plurality of electronic components, in accordance with one embodiment.

Moreover, as shown in FIG. 6, in addition to the ability to provide haptic feedback, each modular section 602 of the haptic gauntlet may also include a processing unit 604 coupled to a memory 606 and a control board 608 to control the actuators 610 and other input or output device connections 612. In some embodiments, the modular section 602 may further comprise one or more sensors 614 and a battery or power source 616. In some embodiments, these components may be housed within a casing or housing, for example a same housing comprising the one or more actuators 610 implementing the inertial mass components. Other embodiments may have the actuators 610 implementing the inertial mass components separate from the other listed components, which can be housed separately in a control module or controller. Other embodiments may have some components located in the anchor component and have the anchor component communicatively coupled to the processing unit 604.

In some embodiments, the processing unit 604 may include any physical digital processor configured to execute computer-executable instructions for implementing aspects of the disclosure, such as to perform haptic feedback. This may include, without limitation, general purpose microprocessors, field programmable gate arrays (FPGAs), digital signal processors (DSPs), graphical processing units (GPUs), micro-controllers, and the like. While a single processing unit 604 is illustrated, the skilled person in the art will appreciate that a plurality of such processors may be used in parallel, or for different tasks. In addition, a control board 608 is shown operably coupled to the actuators 610 and configured to provide basic operational instructions thereto.

The memory 606 comprises both volatile memory and read-only memory. This may include volatile and nonvolatile, removable and non-removable media implemented in any method or technology, alone or in combination, for storage of information such as computer-readable instructions, data structures, program modules or other data. For example, this may include, without limitation, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer.

In some embodiments, the memory 606 may comprise stored thereon a haptic feedback module 618 that typically includes software instructions that allow the processing unit 604 to control the different components of the modular section 602 to provide different types of haptic feedback, for example by providing instructions to the control board 608 which controls the actuators 610. This may include firmware, drivers, application software or the like.

The actuators 610 may include any linear actuator known in the art, include for example voice coil actuators or the like. These are configured to move or displace an inertial mass and provide actuation to the low mass adhesive components illustrated in FIGS. 1-5, as described above.

Additionally, the modular section 602 may comprise or be coupled to different sensors 614 to provide motion and position input. As mentioned above, one type of sensor that may be used is a myoelectric sensors 620, which can sense electrical impulses in the muscles of the forearm to provide position, motion, or other data or information to the gauntlet's processing unit 604 about the position and movement of the arm. In some embodiments, the myoelectric sensors 620 may be provided in the form of a band or bracelet around the user's arm as illustrated in FIG. 5 and be used as an additional input device. Other sensors may include positioning sensors 622 known in the art used to track the motion and position of the arm and hands to provide input to the processing unit 604, which then directly outputs haptic feedback through the gauntlet and/or provide user information to the computing device 624. In some embodiments, the sensors 614 may be communicatively coupled to the processing unit 604 via a cable or wirelessly, without limitation.

In some embodiments, the power source 616 may comprise one or more batteries for powering the modular sections 602 of the haptic gauntlet. In some embodiments, this may include a compartment within a casing of the modular section 602 (as part of the inertial mass component for example) housing one or more non-rechargeable or rechargeable batteries electrically coupled to the other components. In some embodiments, this may include a charging port configured to recharge the batteries and/or provide power directly to the modular sections 602. In some embodiments, to reduce weight of the modular sections 602, the power source 616 may be physically located at a different location than the modular sections 602, for example in a distinct housing or casing worn by the user at another body location, and electrically coupled to the modular sections 602 via a wired connection.

In some embodiments, the additional I/O components 612 may include means to provide additional non-haptic related feedback to the user, for example one or more digital displays, speakers for providing sound, music and/or voice or other output devices known in the art. In addition, the additional I/O components 612 may comprise means for receiving user input (other than provided by sensors 614), either to configure the modular section 602 or as gaming input. This may include, without limitation, buttons, switches, keyboards, but also microphones for receiving voice user input or the like.

In some embodiments, the network component 626 includes a network interface card or module and computer-executable instructions (e.g., a driver) for operating the network interface card or module. Communication between the modular section 602 and the computing device 624 and other devices can occur using any protocol or mechanism over any wired or wireless connection. In some examples, the network component 626 is operable to communicate data over public, private, or hybrid (public and private) networks using a transfer protocol, between devices wirelessly using short range communication technologies (e.g., near-field communication (NFC), BLUETOOTH® branded communications, or the like), or a combination thereof.

The computing device 624 will be understood to include any digital device configured for playing play video games or more generally for providing a 2D or 3D virtual environment for the user to interact with. In some embodiments, this may include virtual reality (VR) or augmented reality (AG) applications, and any kind of immersive simulation. In some embodiments, the haptic gauntlet may be used with any simulated environment application provided for educational purposes, for example training employees to perform complex or dangerous tasks. The computing device 624 may include, without limitation, a desktop computer, laptop, dedicated video game console (including mobile devices), smartphones, smartwatches and so on. The computing device 624 typically comprises or is connectable to a digital display, AR/VR helmet, sound system or speaker and input devices (such as controllers). The computing device 624 may be communicatively coupled to the haptic gauntlet while the user "plays" a video game or "interacts" with a virtual environment. The haptic gauntlet can be used either in addition to the traditional controllers, or in place thereof. In some embodiments, the computing device 624 provides in real-time a plurality of haptic feedback instructions 628 to the module modular section 602 that provides a synchronized sequence haptic feedbacks to perform reflecting in-game events or interactions. This may include, without limitation, the type of haptic feedback to that is to be provided (e.g., skin stretch haptics, vibrotactile haptics, force-feedback haptics, and linear recoil actuation or any combination thereof), a frequency/amplitude modulation and a time duration. In some embodiments, as discussed above, the modular section 602 may be used as an input device and provide continuously or intermittently user input data 630 to the computing device 624, for example data obtained via the sensors 614 (e.g., for example the myoelectric sensor, or positional sensors) or additional I/O components 612, so that actions or movements of the user may be reflected in the virtual environment.

In some embodiments, a plurality of modular sections 602 may be used simultaneously. In some embodiments, the coordination between the multiple modular sections 602 may be done via the computing device 624 and included in the haptic feedback instructions 628. In some embodiments, a plurality of modular sections 602 may share a same processing unit 604 and memory 606, for example one modular section may be communicatively coupled to the other modular sections, either via a wired connection or wirelessly. In some embodiments, a dedicated controller device coupled to the haptic gauntlet comprising the processing unit 604, memory 606 and network component 626 may be communicatively coupled to one or more modular sections.

Figure 7:
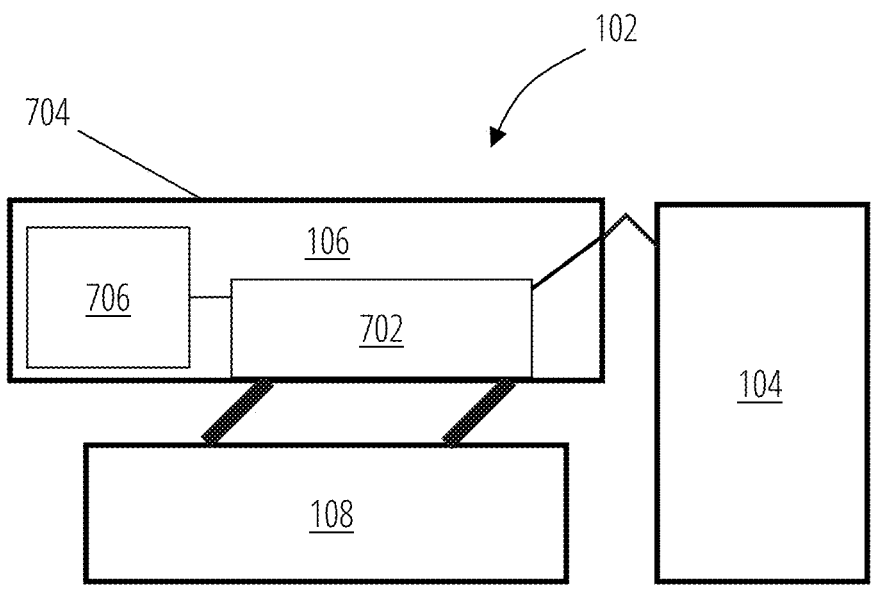
FIG. 7 is a schematic diagram illustrating a modular section comprising a housing, in accordance with one embodiment.

FIG. 7 is a schematic diagram illustrating a modular section where the inertial mass component comprises a casing or housing 704 which includes a linear actuator 702 mechanically coupled to the anchor component 104 and the low mass adhesive component 108, in addition to the additional electronic components 706 (for example those listed in FIG. 6).

Figure 8:
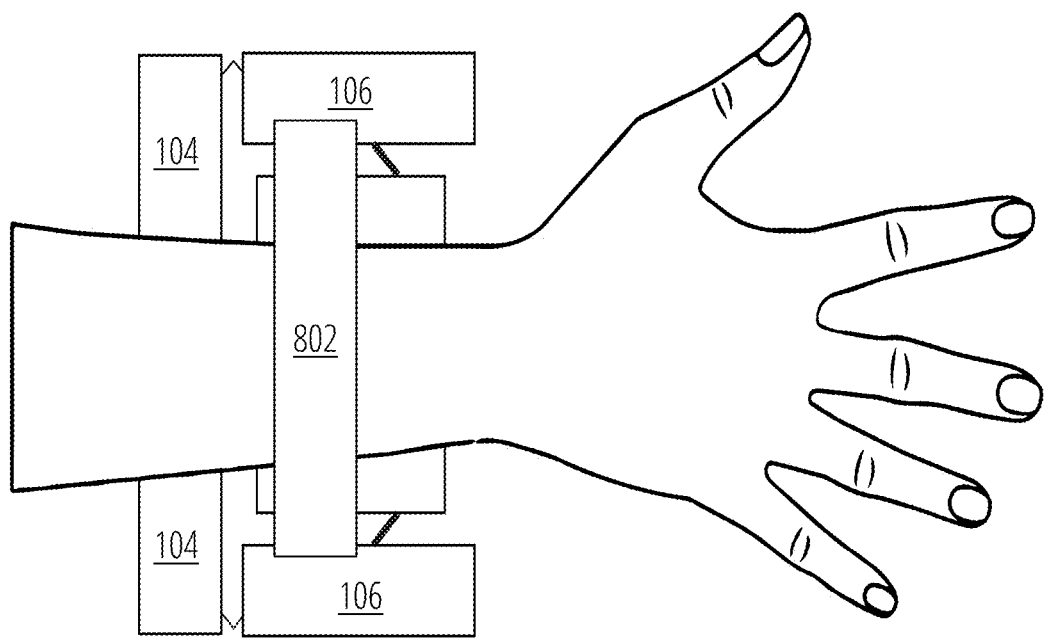
FIG. 8 is a schematic diagram illustrating a retaining means holding the modular sections together around the arm of the user, in accordance with one embodiment.

FIG. 8 is a schematic diagram illustrating an embodiment comprising a retaining means 802 such as an elastic connector in the form of a band or strap, or a rigid bracelet or the like restraining the two modular sections on the arm of the user, in accordance with one embodiment. In this example, the restraining means 802 is coupled to the inertial mass component 106 but other embodiments may couple to other components as well, for example the anchor component. In addition, the restraining means 802 may be used to restrain a plurality of modular sections around the arm of the user, without limitation.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as shown herein and described in detail is fully capable of attaining the above-described object of the present disclosure, the presently preferred embodiment of the present disclosure, and is, thus, representative of the subject matter which is broadly contemplated by the present disclosure.

What is claimed is:

1. A haptic feedback device for providing haptic feedback to an arm of a user comprising:
   a modular section, the modular section comprising:
      an anchor component having a first impedance coupled to the skin of the arm at a first location;
      a low mass component having a second impedance coupled to the skin of the arm at a second location;

an inertial mass component having a third impedance mechanically coupled to said anchor component and to said low mass component via one or more couplings; and
configured to provide actuation thereto; and
wherein said first impedance is larger than said second and third impedances, so that upon said actuation said low mass component is displaced by a larger amount than said anchor portion, said displacement of the low mass component moving a portion of the skin proximate said second location thereby creating a haptic feedback.

2. The haptic feedback device of claim 1, wherein said inertial mass component comprises a linear actuator.

3. The haptic feedback device of claim 1, wherein said anchor component and said low mass component are each affixed to the skin via an adhesive or fastener.

4. The haptic feedback device of claim 1, wherein said first location of the anchor component is located on a distal portion of the arm relative to said second location of the low mass component.

5. The haptic feedback device of claim 1, wherein said first location of the anchor component is located on a proximal portion of the arm relative to said second location of the low mass component.

6. The haptic feedback device of claim 4, comprising a plurality of modular sections distributed around the circumference of the arm.

7. The haptic feedback device of claim 6, wherein said plurality of modular sections are coupled together via a restraining means.

8. The haptic feedback device of claim 1, wherein the modular section is configured to provide skin stretch haptics by displacing via a static force provided by the inertial mass component the low mass component away relative to the anchor component causing a portion of the skin between the low mass component and the anchor component to stretch.

9. The haptic feedback device of claim 1, wherein the modular section is configured to provide inertial actuation by having the inertial mass component vibrating at a designated frequency.

10. The haptic feedback device of claim 1, wherein the modular section is configured to provide linear recoil actuation by having the inertial mass component actuating in pulses in a designated direction to provide an impulse to the arm along a primary axis.

11. The haptic feedback device of claim 1, wherein the modular section is a first modular section positioned of a first portion of the arm, further comprising a second modular section positioned on a second portion of the arm opposite said first portion; the haptic feedback device further comprising:
an elongated grip portion configured to be held in the hand of the user, the grip portion mechanically coupled at one end thereof to the inertial mass component of the first modular section, and coupled at a second end thereof to the inertial mass component of the second modular section; and
wherein the inertial mass components of the first modular section and of the second modular sections are configured to be linearly displaced thereby providing torques and forces to the grip portion and provide a force feedback to the hand.

12. The haptic feedback device of claim 1, further comprising one or more sensors communicatively coupled to the inertial mass component.

13. The haptic feedback device of claim 12, wherein said one or more sensors comprise at least one myoelectric sensor coupled to the skin of the arm configured to provide position or motion data to the inertial mass component.

14. The haptic feedback device of claim 1, wherein said modular section is communicatively coupled to a computing device configured to generate a simulated environment, and wherein said haptic feedback is provided upon receiving haptic feedback instructions from the computing device.

15. A method for providing haptic feedback to the arm of a user comprising the steps of:
affixing an anchor component having a first impedance coupled to the skin of the arm at a first location;
affixing a low mass component having a second impedance to the skin of the arm at a second location;
actuating via an inertial mass component mechanically coupled to the anchor component and the low mass component, said anchor component and the low mass component; and
wherein said first impedance is larger than said second and third impedances, so that upon said actuation said low mass component is displaced by a larger amount than said anchor portion, said displacement of the low mass component moving a portion of the skin proximate said second location thereby creating a haptic feedback.

16. The method of claim 15, wherein said actuation provided by the inertial mass component displaces via a static force the low mass component away relative to the anchor component causing a portion of the skin between the low mass component and the anchor component to stretch.

17. The method of claim 15, wherein said actuation is an inertial actuation provided by having the inertial mass component vibrating at a designated frequency.

18. The method of claim 15, wherein said actuation is a linear recoil actuation provided by having the inertial mass component actuating in pulses in a designated direction to provide an impulse to the arm along a primary axis.

19. The method of claim 15, further comprising the steps of, after said affixing the low mass component but before said actuating:
receiving, by the inertial mass component, from a myoelectric sensor coupled to the skin of the arm and communicatively coupled to the inertial mass component, position or motion data to the inertial mass component; and
wherein said actuating is based on, at least in part, said position or motion data.

20. The method of claim 15, further comprising the steps of, after said affixing the low mass component but before said actuating:
receiving, by the inertial mass component, from a computing device communicatively coupled to the inertial mass component, haptic feedback instructions; and
wherein said actuating is provided based, at least in part, on said haptic feedback instructions.

* * * * *